March 6, 1945.  W. STRAUSS  2,371,077
OPERATION CHECK AND CONTROL SYSTEM FOR MOLDING MACHINES
Filed Oct. 21, 1941  3 Sheets-Sheet 1
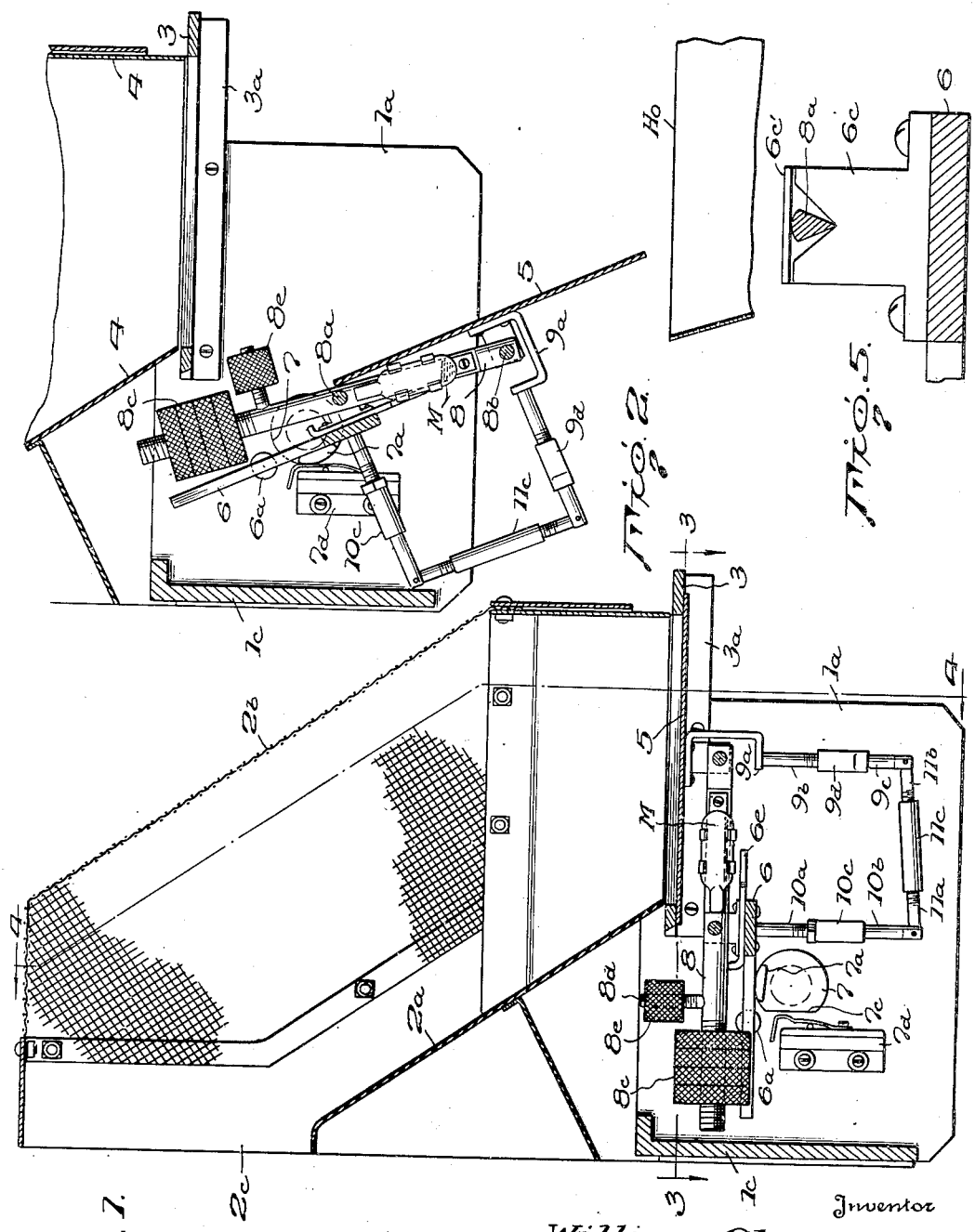
Inventor
William Strauss,
By Ralph B. Stewart
Attorney

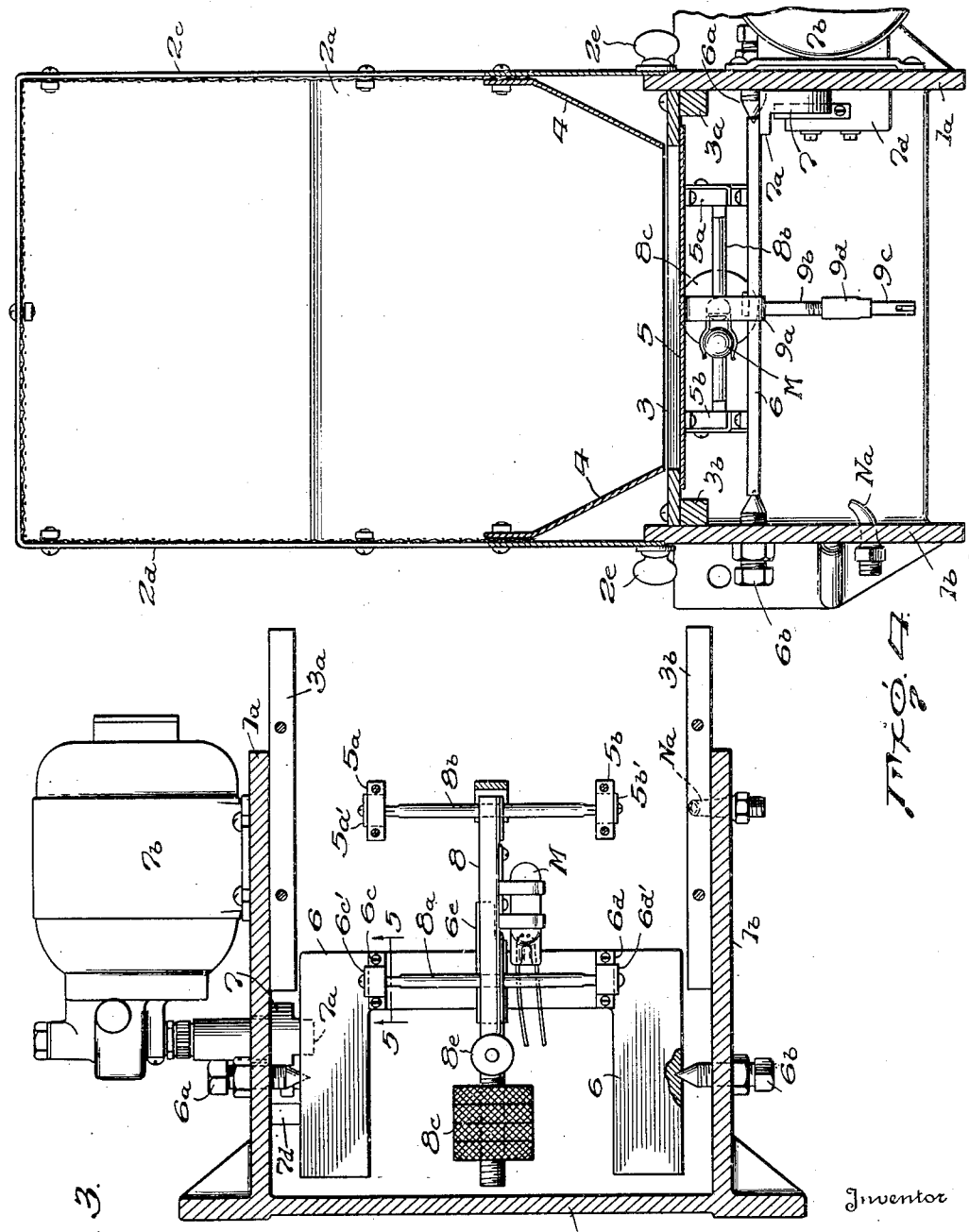

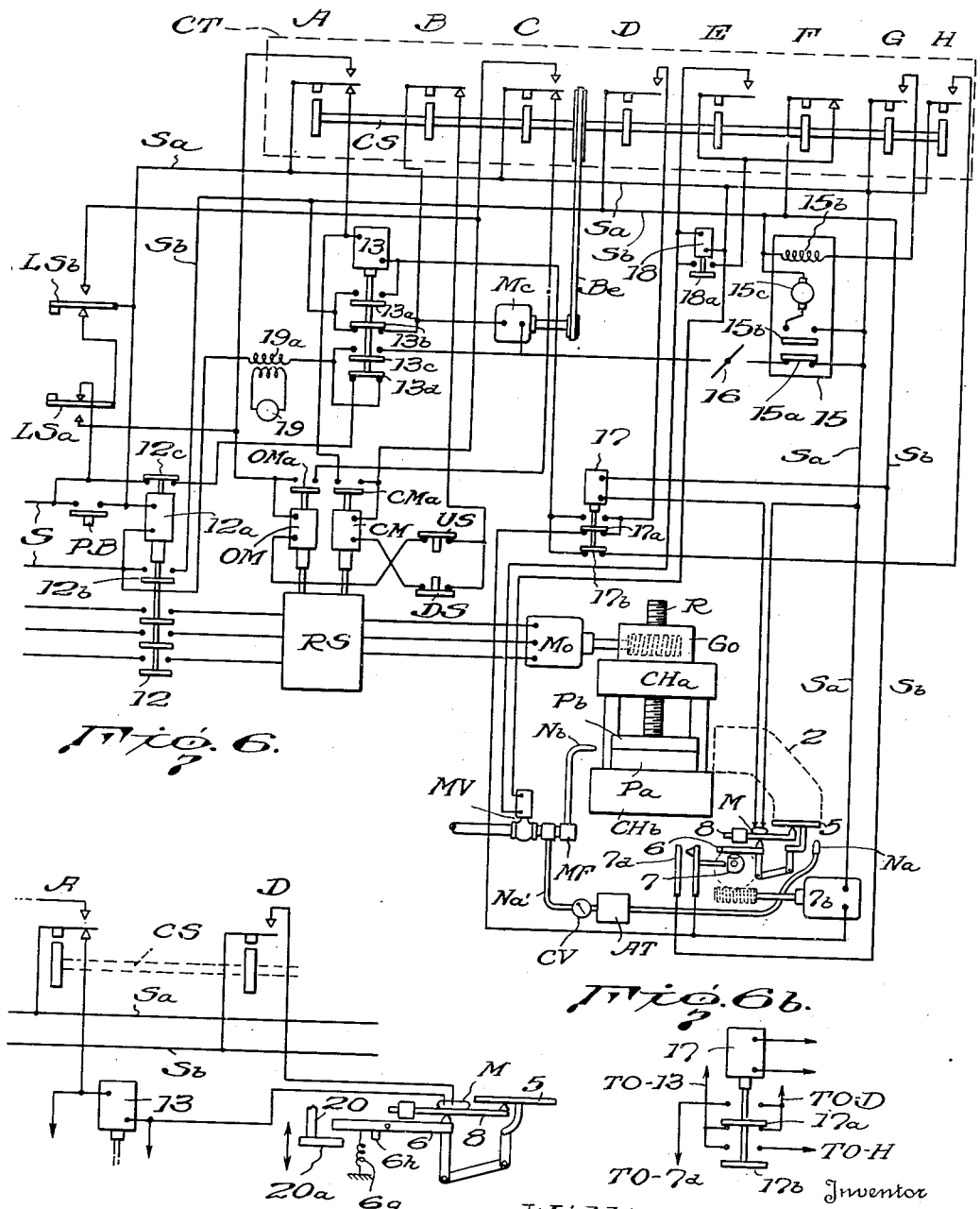

Patented Mar. 6, 1945

2,371,077

UNITED STATES PATENT OFFICE 2,371,077

OPERATION CHECK AND CONTROL SYSTEM FOR MOLDING MACHINES

William Strauss, Philadelphia, Pa., assignor to F. J. Stokes Machine Company, a corporation of Pennsylvania Application October 21, 1941, Serial No. 415,960

6 Claims. (Cl. 209—121)

This invention relates to a safety device for checking the operation of an automatic molding machine. The invention is also concerned with the control system in which the safety device is used for operating an automatic molding press to stop the press when it fails to discharge a molded article, or the proper number of articles, during each cycle.

The present invention is an improvement over the operation checks and the control systems disclosed in my prior Patent 2,242,189 and in my pending application Serial No. 399,523, filed June 24, 1941.

In the safety devices embodied in my prior patent and application, the molded article is discharged into a chute forming part of the safety device, and a pivoted plate is arranged across the lower end of the chute and is depressed by the weight of the article. The tilting of the plate controls an electric circuit in such manner that the operation of the press is continued from one cycle to another so long as a molded article is discharged from the press at the proper time in each cycle. If a molded article is not discharged in any cycle, the pivoted plate remains in its normal position across the chute, and the control system automatically stops the press until an attendant discovers and remedies the difficulty.

In these prior arrangements involving a simple weighing plate mounted to be tilted about a pivoted axis, the device is not equally sensitive throughout the area of the plate, because the turning moment depends on the distance between the article on the plate and the pivotal axis of the plate. In other words, a given weight located at a given distance from the axis would be sufficient to tilt the plate, but might not be sufficient to tilt the plate when located closer to the pivotal axis. These safety devices give satisfactory operation where a single article is molded in each cycle and where the weight of the article is sufficient to tilt the plate at any point on the plate, but a simple pivoted plate is not entirely reliable where a number of articles are molded in each cycle and discharged into the chute and where there is a possibility that the articles may become stacked or piled on the plate near the pivotal axis at one time and removed from the axis at another time. In checking the operation of a multiple cavity press for molding a number of articles during each cycle, it is also desirable that the safety devices shall be sufficiently sensitive to detect the absence of one or more of the articles in any cycle. Accordingly, it is important that the safety device involve a weighing device which is sensitive to a small difference in weight and which is equally sensitive throughout its area.

An object of the present invention is to provide a safety device involving a weighing plate which is equally sensitive throughout its effective area.

A further object is to devise an improved control system for controlling the operation of a molding press and for checking its operation by my improved safety device.

Another object is to devise novel and improved means for resetting the safety device after each checking operation and preparing the device for operation in a succeeding cycle.

Still another object is to provide a checking circuit to stop the operation of the press in case the weighing plate is not returned to its normal position after each operation.

According to my invention I provide a substantially horizontal weighing plate mounted for limited vertical movement with respect to a normally stationary support, and the support is pivotally mounted for tilting the weighing plate from the horizontal position. The limited vertical movement of the horizontal weighing plate with respect to the pivoted support controls an electric switch which in turn controls the press to continue operation from one cycle to another, and the switch also initiates operation of a suitable power device, such as an electric motor, for operating the pivoted support to tilt the weighing plate out of the horizontal position and thereby permit the molded articles to slide from the plate by gravity. The pivoted support is operated through a complete cycle and returned to its normal position.

The preferred form of my invention is illustrated in the accompanying drawings in which Figure 1 is a vertical sectional view of the safety device showing the weighing plate in normal position;

Figure 2 is a vertical sectional view showing the lower portion of the safety device and illustrating the weighing plate in its tilted or discharging position;

Figure 3 is a sectional view taken along line 3—3 of Figure 1;

Figure 4 is a sectional view taken along line 4—4 of Figure 1;

Figure 5 is an enlarged sectional view taken along line 5—5 of Figure 3; and

Figure 6 is a schematic diagram showing one example of a complete control system employing my safety device for controlling the operation of a molding press.

Figures 6a and 6b illustrate modifications.

Referring to the drawings, the safety device involves a supporting frame consisting of two side walls 1a and 1b and a back wall 1c, the frame being supported on a suitable portion of the molding press and on the side of the press where the molded articles are discharged. Supported upon the frame 1a—1b—1c is a chute having a bottom wall 2a, a top wall 2b and suitable side walls 2c and 2d. The bottom wall 2a is preferably formed as a solid wall, although it might be formed of mesh material. The top wall 2b, and a portion of the side walls 2c and 2d, as shown in Figure 1, are formed of mesh material such as screen wire or the like, for a purpose hereinafter indicated. The upper open end of the chute is arranged adjacent the mold platens and in a position to receive the molded article or articles as they are discharged from the press. Usually the articles will be blown from the press by an air jet, and the discharged articles will strike the top wall 2b and be deflected downwardly into the chute while the air stream will be permitted to continue through the wall 2b and through the mesh portions of the side walls. The chute is preferably formed as a unitary structure and is detachably secured to the frame walls 1a and 1b by suitable fastening screws such as thumb screws 2e, 2e.

Supported between frame walls 1a and 1b is a substantially horizontal plate 3 having a central opening therein, the plate 3 being mounted upon suitable supporting bars 3a and 3b secured to vertical walls 1a and 1b, respectively. Mounted within the lower end of the chute is a mouthpiece 4 having inclined side walls for directing the discharged articles into the central opening in the horizontal plate 3.

A weighing plate 5 is supported below the horizontal plate 3 and forms the surface for receiving the articles which are discharged into the chute of the safety device.

Plate 5 is pivotally mounted to permit limited vertical movement under the weight of the article discharged into the chute, and the plate is also pivotally mounted to permit tilting so that the discharged articles will slide from the plate by gravity.

The mounting for the plate 5 includes a plate 6 pivotally supported in a substantially horizontal position between walls 1a and 1b by means of a pair of pivot screws 6a and 6b, as clearly shown in Figures 3 and 4. The central rear portion of the plate 6 is cut away to prevent interference with other parts of the mounting for plate 5. The plate 6 is normally held in a substantially horizontal position by means of a lateral projection 7a carried by cam disc 7 which is mounted on a shaft journaled in wall 1a.

A lever 8 is pivotally supported upon plate 6 near the front edge thereof by means of a transverse rod 8a secured thereto and having the ends thereof pivotally supported by pivot blocks 6c and 6d. As shown in Figure 5, the pivot blocks 6c and 6d are provided with notches in their top faces and the ends of pivot rod 8a are shaped to provide a knife-edged pivot seated in the notches of the two blocks. Suitable retainer angle-pieces 6c' and 6d' are provided to prevent endwise movement of the pivot rod 8a and to retain the ends of rod 8a seated in the pivot notches.

A second pivotal rod 8b is mounted at the end of lever 8 transversely thereof, and this rod provides a pivotal mounting for the weighing plate 5. The pivotal connection between the transverse rod 8b and plate 5 involves a pair of knife-edged pivotal mountings at the ends of rod 8b having substantially the same construction as the pivotal mountings shown in Figure 5. These mountings involve a pair of notched pivot blocks 5a and 5b cooperating with the knife-edged ends of rod 8b, and each block is provided with retainer pieces 5a' and 5b'. For the purpose of maintaining plate 5 in a normally horizontal position, a rigid arm is secured to the plate and extends downwardly therefrom, the arm comprising a bracket 9a secured to the lower side of plate and having mounted thereon two threaded rod sections 9b and 9c joined by a thread sleeve 9d. A similar rigid arm consisting of threaded rod portions 10a and 10b joined by threaded sleeve 10c is secured to plate 6 and extends downwardly therefrom. The lower ends of these two rigid arms are joined together by an adjustable link consisting of threaded rod portions 11a and 11b coupled by a threaded sleeve 11c. By properly adjusting sleeves 9c and 10c and 11c to provide a parallelogram between the four pivot points, the plate 5 is maintained in a horizontal position when the plate is depressed under the weight of the molded article and the lever 8 is tilted about its supporting pivots. A finger or extension 6e is secured to plate 6 beneath lever 8 and serves as a stop to limit the amount of pivotal movement of the lever 8 with respect to the plate 6, and to thereby limit the amount of downward movement of the plate 5 under the weight of the molded articles.

The rear end of lever 8 is threaded, and one or more threaded counterweights 8c are supported on the threaded end of lever 8 for counterbalancing the weight of plate 5 and its supporting parts. Preferably the counterbalance more than compensates for the plate 5 and its supporting elements and supplies a biasing force urging the plate 5 against the lower face of plate 3. I prefer also to provide a threaded stem 8d extending upwardly from lever 8, and this stem carries a threaded counterweight 8e. The purpose of this counterweight is to render the pivot lever 8 and the associated elements "top-heavy" and to prevent rebound of the plate 5 when it is depressed by a molded article. It will be noted that the counterweight 8e lies above the horizontal planes of the two pivotal axes of rod 8a and 8b.

The safety device may be adjusted for articles of different weights by adjusting the position of weights 8c on lever 8. When properly adjusted, plate 5 will be depressed by an article of proper weight but not by an article which is underweight. Also, where the device is used to check the operation of a multiple cavity press, the plate will be depressed when the correct number of articles have been deposited on the plate, but will not respond if one or more article is missing.

As explained above, pivoted plate 6 is maintained in a substantially horizontal position by means of projection 7a on cam disc 7, and the plate 6, together with the plate 5 mounted thereon, may be moved to a tilted position as shown in Figure 2 by rotating the cam disc 7. The shaft of the cam 7 is rotated by a motor 7b through suitable speed reducing gearing, the motor and gearing being mounted on wall 1a as shown in Figures 3 and 4. Cam disc 7 is provided with a flat portion 7c on its periphery, and a normally open micro-switch 7d is mounted on plate 1a and its operating arm is positioned adjacent the flat portion 7c of the cam wheel 7, so that the switch 7d is normally open when plate 6 is maintained in its horizontal position, but rotation of cam 7 will cause the switch 7d to close and remain closed for a complete rotation of the cam.

A mercury type of switch M is mounted on pivot lever 8, and this switch is preferably mounted in a position such that the contacts of the switch are normally bridged by the mercury when lever 8 is in the horizontal position shown in Figure 1, but when the lever is tilted to come into contact with the stop finger 6e, the mercury in the switch runs by gravity to the righthand end of the switch envelope and interrupts the circuit between the contacts.

A jet nozzle Na is mounted on wall 1b below plate 5 and is arranged to direct a jet of air against the underside of plate 5 simultaneously with the blowing of the molded article from the press by an air blast. Thus the jet produced at nozzle Na will counteract any pressure on the upper face of plate 5 which may be caused by the air blast employed to discharge the article from the press into the safety device.

Figure 6 is a diagrammatic showing of a molding press, illustrating one arrangement of electric control circuits therefor, including the operation check described above. Any suitable type of molding press may be employed, but for the purpose of illustration, I have shown a mechanical type of press involving an upper crosshead CHa and a lower crosshead CHb carrying the lower mold platen Pa, while the upper mold platen Pb is carried by a threaded ram R which is raised and lowered by any suitable power means such as motor Mo operating through suitable gearing represented as Go. Various details of the press, such as the knock-out pins, the feeding device, etc., are not shown since they are not necessary to explain the operation of the control system. Motor Mo is controlled by a reversing switch RS which in turn is controlled by electromagnets OM and CM to drive the motor in proper directions to open and close the press, respectively. The circuit to motor Mo is also controlled by an electrically operated main switch 12, having an operating winding 12a.

Current for energizing winding 12a and for energizing the various control circuits is supplied from a suitable supply circuit S. A normally open push-button PB controls the circuit to winding 12a, and the contacts of this push-button are normally bridged by a connection including a normally closed contact on limit switch LSa, and a normally closed contact on limit switch LSb. A conductor Sa is connected to one conductor of circuit S through the bridging connection completed by limit switches LSa and LSb, and a supply conductor Sb is connected to the other conductor of circuit S through contact 12b on main switch 12 when this switch is in closed position. Current for operating the various control relays supplied from conductors Sa and Sb, and these relays and circuits are controlled in timed relation by a controller represented within the dotted rectangle CT. This controller may be of any suitable construction consisting of a number of control switches A, B, C, D, E, F, G, H operated in predetermined timed relation by suitable means, such as that shown in U. S. Patent 2,250,342, but for the purpose of illustration, I have shown the operating means as involving individual cam elements mounted on a rotary shaft CS driven from a controller motor Mc through a suitable driving connection represented by the belt Be. As will be seen from the drawings, switches B and F are single-pole normally closed switches, switches D, E, G and H are single-pole normally open switches, and switches A and C are single-pole double-throw switches with the front contacts thereof normally closed. Preferably, all of the switches A to H inclusive are operated by the associated cams so that they are moved only momentarily from their normal position to their operated position and then returned to the normal position. Each cam disc may have one or more operating projections as required, and the cams are angularly adjustable on shaft CS.

Current for energizing magnets OM and CM is supplied through a common connection from conductor Sb through normally closed contact 13b of stopping relay 13, through controller switch B, and from this point the two magnet circuits divide and the circuit for magnet OM is completed through the "up" limit switch US, through magnet OM, through the back contact of controller switch A, and back to conductor Sa. Magnet OM closes contact OMa to complete a holding circuit for the magnet through the front contact of controller switch C to conductor Sa. The circuit to magnet CM is completed through the "down" limit switch DS through magnet CM, and through the back contact of controller switch C, to conductor Sa. Magnet CM closes contact CMa to complete a holding circuit for this magnet through the front contact of switch A to conductor Sa.

Current for operating the controller motor Mc is supplied from conductor Sa through a normally closed contact 15a of timing relay 15, through a hand operated switch 16, through the motor Mc, and through normally closed contact 13b on relay 13, back to conductor Sb.

The energizing circuit for relay 13 extends from conductor Sa through the front contact of switch A, through the relay 13, and then the circuit divides and may be completed through contact 17a, on relay 17, to switch D, to conductor Sa, when relay 17 is energized, or, it is completed through contact 17b and through switch H to conductor Sa when relay 17 is de-energized. A holding circuit for relay 13 is completed from the relay winding through contact 13a to conductor Sb when the relay is energized.

Checking relay 17 is energizing from supply conductors Sa and Sb through a circuit controlled by normally closed checking switch M in the safety device.

Controller switches E and F control a circuit for energizing magnet valve MV which supplies air to air jets Na and Nb. Switches E and F also energize locking relay 18 having a contact 18a which bridges the contacts of switch E and completes a holding circuit for itself through switch F.

Controller switch G controls the circuit for energizing the clutch coil 15d of a time relay 15 which may be of any suitable construction, such as the relay shown in United States Patent 2,175,865. When the clutch coil is energized, it opens the normally closed contact 15a and closes the normally open contact 15b to energize the motor element 15c of the relay. The motor begins driving the time mechanism and after a predetermined time, contacts 15a and 15b are released and returned to their normal position.

A signal device 19 which may take the form of an audible signal or a visible signal, or both, is energized through a transformer 19a having a primary circuit extended from the lower conductor S through the transformer 19a, and from this point a circuit is completed through contact 13d of relay 13 when this relay is de-energized, through contact 12c when relay 12 is de-energized, and back to the upper conductor S. When relay 13 is energized, the primary circuit of transformer 19a is completed through contact 13c on relay 13, through hand switch 16 and through contact 15a on time relay 15 to conductor Sa which in turn is connected to the upper conductor S through limit switches LSa and LSb.

The operation of the arrangement shown in Figure 6 is as follows: It will be assumed that main switch 12 is closed and relay 17 is energized. It will also be assumed that the press is closed and is ready to be opened at the end of a molding cycle. Switch A is operated momentarily by the controller to close the circuit to "open" magnet OM which operates and starts motor Mo in a direction to raise the upper platen. Magnet OM establishes its own locking circuit through contacts OMa and through switch C.

During the upward movement of the upper platen, and after the molded articles have been ejected from the mold cavities in the lower platen, or concurrently therewith, switch E operates momentarily to energize the control relay 18 which in turn completes a holding circuit for itself through its contact 18a and through the normally closed contacts of switch F back to conductor Sb. The contact 18a on relay 18 closes the circuit to energize magnet valve MV which admits air to nozzle Nb which directs a blast of air across the space between the platens Pa and Pb to discharge the molded articles into the chute 2 of the safety device. The valve MV also controls the admission of air to the nozzle Na through the connection Na' shown in Figure 6, thus supplying a blast of air against the underside of weighing plate 5 at the same time that the articles are being discharged by the blast of air from nozzle Nb. After a predetermined time, switch F is momentarily opened to de-energize relay 18 and thereby de-energize magnetic valve MV.

As the upper platen continues to rise, a suitable feeding device, not shown, supplies a new charge of molding material to the mold cavity or cavities in the lower platen Pa. On continued upward movement of the upper platen, the circuit of the magnet OM will be interrupted by the limit switch US which is located on the press in a position to be operated by a part driven by the ram R. This will stop the press and it will remain stopped until operation of the controller switch C which will then start motor Mo in a direction to close the press. If desired, switch C may be set to operate and reverse motor Mo before the ram reaches a position to open limit switch US.

Sometime after the molded articles have been discharged into the safety device, and at a time when the articles are resting upon plate 5, switch D closes momentarily and completes a circuit to control magnet 13 through a contact on control relay 17, provided relay 17 is energized. Relay 17 is normally energized, since its energizing circuit is normally completed through the mercury switch M mounted on lever 8 in the safety device. However, if a molded article has been deposited on weighing plate 5, the circuit to relay 17 is interrupted at switch M and this relay will prevent the closing of the circuit to relay 13. Switch D, however, completes a circuit from conductor Sa through switch D, through contact 17a on relay 17, through motor 7b, and back to supply conductor Sb. Motor 7b begins to operate and rotate the cam 7 which in turn closes switch 7d to maintain the circuit of the motor closed independently of the switch D. The motor 7b continues to operate and drive the cam 7 through a complete rotation until switch 7d opens and interrupts the motor circuit, thus causing the weighing plate 5 to tilt and discharge the molded article or articles into a suitable receptacle or hopper Ho shown in Figure 2, and to return to its original position for another operation.

If the press fails to discharge an article of the proper weight, or fails to discharge the proper number of articles to depress the plate 5, then relay 17 will be energized at the time switch D operates, and the circuit to stopping relay 13 will be completed through contact 17a on relay 17. Operation of relay 13 will interrupt the current to switch magnets OM and CM, and to the controller motor Mc, thus stopping power motor Mo and controller motor Mc. Relay 13 also closes a circuit to energize signal 19 through its contact 13c, and this signal will continue to operate until an attendant discovers and remedies the cause for the improper operation of the press.

The checking operation described above may take place at any time during the molding cycle after the molded articles have been discharged from the press into the safety device, but I prefer to set switch D for operation to stop the press before a new charge of material is fed to the lower platen, in case an article is not discharged into the safety device.

In continuing through another molding cycle, the upper platen is driven downwardly by the motor Mo controlled by switch C, and the downward movement of the platen may be stopped after the platens have closed, either by operation of switch B, or by opening of lower limit switch DS which may be mounted upon the press in a position to be operated by a movable part of the press after sufficient pressure has been developed between the two platens. For example, the lower platen may be supported on springs so that it will be depressed by the upper platen, and switch DS may be operated by a predetermined movement of the lower platen, see Patent 2,242,189. If it is desired to allow for "breathing" of the mold, provision is made to raise the ram by operation of switch A, and after the ram has been raised to a predetermined amount switch B operates to stop the ram, and after a certain time allowed for breathing, switch C will operate to drive the ram back to closed position.

When the upper platen is operated to closed position for molding, switch G is operated momentarily to energize clutch coil 15b on time-relay 15, and this opens contact 15a and closes contact 15b to start counting the curing time. The controller motor is stopped by the opening of contact 15a, and this circuit remains open until the time-relay 15 counts off the curing time and releases contacts 15a and 15b, thus re-energizing the control motor and continuing the controller through its cycle to open the press by operation of switch A.

Switch H of the controller is set to operate some time after operation of switch D and at a time when the plate 5 has been returned to its normal position in readiness for another operation. If plate 5 is in its normal position, relay 17 will be energized, and the circuit to stopping relay 13 through switch H will be interrupted at the contact 17b on relay 17. If for any reason the plate 5 has not been returned to its normal position at the time switch H closes, the circuit to relay 13 will be completed through switch H and through contact 17b, thereby energizing relay 13 and interrupting the current to reversing switch magnets OM and CM, and to the control motor Mc, thus stopping the press. The relay 13 will also close a circuit to energize signal 19 through its contact 13c, and the signal will continue to operate until an attendant discovers and remedies the difficulty.

Limit switches LSa and LSb are provided on the press and are operated by some moving part of the press so that switch LSa is operated if the press overruns in closing, and switch LSb is operated if the press overruns in opening. Operation of either switch opens the bridge circuit around push-button PB and thereby opens the main line switch 12, and also de-energizes all relays which are energized from conductors Sa and Sb. The opening of switch 12 closes a circuit for energizing signal 19 through contact 12c. It will also be noted that operation of switch LSa prepares a circuit for energizing the opening magnet OM, while operation of switch LSb prepares a circuit for energizing closing magnet CM. Accordingly, when either switch operates, the press may be brought back to normal position simply by pressing push-button PB which closes the main line switch 12 and re-energizes conductors Sa and Sb.

While the checking operation provided by switch H is desirable, it is not essential, and switch H may be omitted if desired.

The pivot plate 6 may be tilted mechanically by some moving part of the press, and it is not essential to use a separate motor for this purpose. For example, as shown in Figure 6a, the pivoted plate 6 may be normally biased by a spring 6g or other biasing means against a fixed stop 6h to hold the plate in its normally horizontal position but permitting the plate to be tilted downwardly. The plate 6 is tilted downwardly and returned to its normal position once during each cycle by a suitable mechanical connection, such as the rod 20 carrying a finger 20a for engaging the underside of a projecting portion of the plate 6 on the back side thereof, the rod 20 being mechanically connected and reciprocated vertically by some part of the press. For example, it may be driven by the upper platen or by some other movable element driven by the ram. Where the plate 7 is tilted mechanically, the switch M may be connected directly in the circuit of checking relay 13, as shown in Figure 6a. The remaining connections of the control system would be in accordance with Figure 6 except that switch H, relay 17 and motor 7b with their connections are omitted.

Instead of mounting switch M so that it is normally closed, this switch may be mounted to be normally open. In this case, the contacts on relay 17 must be modified as shown in Figure 6b so that the contacts which previously were normally closed will be open, and the contacts which previously were normally open will be closed.

The arrangement for tilting the weighing plate to discharge the articles therefrom, which may be termed an unloading means, may be operated by an electro-magnet instead of a motor, or by other electrically controlled means such as an air cylinder or an hydraulic cylinder.

Where the supply line leading from control valve MV to the air nozzle Nb is larger than the supply line Na' leading to nozzle Na, the difference in size of the supply lines may result in an accumulator effect in the larger supply line which tends to cause the blast from nozzle Nb to continue for a time after closing of valve MV. This is especially true where a number of nozzles Nb are supplied from a manifold MF. Where the accumulator effect in the connections to the nozzle Nb becomes appreciable, I provide an accumulator tank AT in the connection Na' leading to nozzle Na, and I also insert a check-valve CV between the tank AT and the control valve MV to permit air to enter the tank AT but prevent backflow. The accumulator action of the tank AT maintains the blast at the nozzle Na until after the blast at nozzle NB ceases, thus preventing operation of the safety device by the blast from nozzle Nb after the valve MV has been closed. The presence of check-valve CV prevents flow of air under pressure from tank AT to the nozzle Nb after the valve MV closes. A separate accumulator tank is not required but the desired effect can be obtained by using connections of proper size between check-valve CV and nozzle Na.

What I claim is:

1. In a device for checking articles, the combination of a pivotally mounted support, means for normally holding said support in a predetermined position, a weighing plate, means for mounting said weighing plate upon said pivoted support in a substantially horizontal position and to be tiltable with said support about the pivotal axis thereof, said mounting means permitting said plate to move vertically with respect to said pivoted support under the weight of the articles to be checked, means for tilting said pivoted support and thereby tilting said plate to a position where the articles on said plate will be discharged therefrom by gravity, and means controlled by the vertical movement of said weighing plate with respect to said pivoted support for actuating said tilting means to its tilting position and for returning said pivoted support to its normal position.

2. A checking device according to claim 1 wherein said last recited means includes an electric motor, a connection between said motor and said pivoted support for driving said support through a predetermined tilted angle and returning the same to its original position, an electric circuit for energizing the motor including a normally open switch controlled by said weighing plate to close said circuit, and a second switch controlled by said driving connection for maintaining the motor circuit closed after said articles have been discharged from said plate.

3. In a device for checking articles, the combination of pivotally mounted support, means for normally holding said support in a predetermined position, a balancing lever pivotally mounted upon said support and having a counterweight adjustably mounted on one end thereof, a weighing plate pivotally supported on the other end of said balancing lever whereby said plate is vertically movable with respect to said pivoted support under the weight of the articles to be checked, means for maintaining said weighing plate in a substantially horizontal position during tilting of said balancing lever, said weighing plate being tiltable from its horizontal position about the pivoted axis of said support by rotation of said support about its pivoted axis, and means for tilting said pivoted support about its pivoted axis to a position where the articles on said plate will be discharged therefrom by gravity.

4. A checking device according to claim 3 wherein said pivotally mounted support comprises a plate element pivotally supported in a substantially horizontal position on an axis displaced from the center of gravity thereof, and wherein the means for normally holding said support in a predetermined position comprises a rotary cam-like element engaging the lower face of said pivoted plate and normally holding said plate in a horizontal position, but being rotatable to permit said plate to tilt about its pivotal axis by the action of gravity on said plate.

5. In a device for checking articles, the combination of a pivotally mounted support, biasing means for normally holding said support in a predetermined position, a weighing plate for receiving said articles, means for supporting said weighing plate in a substantially horizontal position upon said pivotally mounted support and permitting limited vertical movement of said plate with respect to said support while maintaining said plate in a substantially horizontal position, said weighing plate being tiltable from its horizontal position about the pivoted axis of said support by rotation of said support about its pivoted axis, and means for tilting said pivoted support against the action of said biasing means and thereby tilting said plate to a position where the articles on said plate will be discharged therefrom by gravity.

6. In a device for checking articles, the combination of a weighing plate for receiving said articles, means for mounting said plate in a substantially horizontal position for permitting limited vertical movement under the weight of said articles and about a pivotal axis while maintaining the articles thereon, said mounting means including means for mounting said plate on a second pivotal axis to permit said plate to be tilted to a position where the articles on said plate will be discharged therefrom by gravity, an electric motor, means driven by said motor for tilting said plate through a predetermined angle from a horizontal position to discharge articles on said plate by gravity and for returning said plate to its original position, an electric circuit for energizing said motor including a normally open switch controlled by said limited vertical movement of said weighing plate to close said circuit, and a second switch controlled by said motor driven means for maintaining the motor circuit closed after said articles have been discharged from said plate.

WILLIAM STRAUSS.